UNITED STATES PATENT OFFICE.

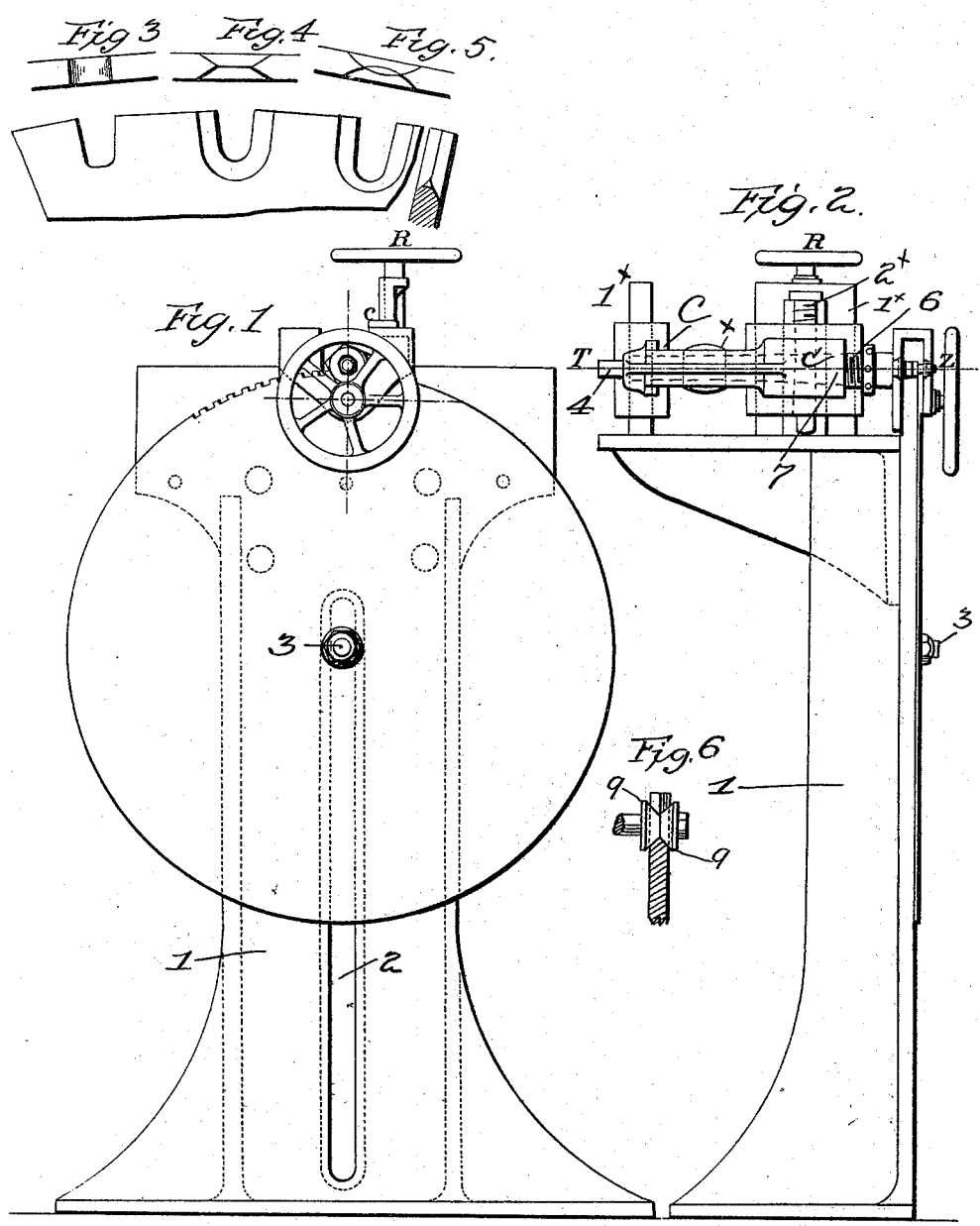

FÉLIX JULES GRÉGOIRÉ FROMHOLT, OF PARIS, FRANCE.

MACHINE FOR CUTTING TOOTH-RECESSES IN SAW-BLADES.

SPECIFICATION forming part of Letters Patent No. 530,407, dated December 4, 1894.

Application filed January 15, 1894. Renewed November 1, 1894. Serial No. 527,679. (No model.) Patented in France November 25, 1891, No. 217,651.

*To all whom it may concern:*

Be it known that I, FÉLIX JULES GRÉGOIRÉ FROMHOLT, a citizen of the French Republic, residing in Paris, France, have invented certain new and useful Improvements in Machines for Cutting Tooth-Recesses in Saw-Blades and for Like Purposes, of which the following is a specification.

The invention has been patented in France November 25, 1891, No. 217,651.

My invention consists in a machine for cutting recesses in saw blades and the like adapted to receive the saw teeth.

As illustrated herein the apparatus is shown as operating in connection with a circular saw blade.

In the drawings, Figure 1 is a front view of the machine; Fig. 2, a side elevation and Figs. 3, 4 and 5 show the form of tooth recesses in the saw blade. Fig. 6 is a detail view of the conical cutting disks in connection with the saw plate.

The frame of the machine comprises essentially a standard 1 having a vertical slot 2 in which is adjustably secured a bolt 3 provided with clamping nuts. This bolt passes through the eye of the circular saw and supports the same in position and it may be adjusted up or down in the slot and clamped with the saw blade in any desired position to properly present the saw to the cutting tool. A carriage C is arranged on suitable ways $1^{\times}$ of the stationary frame to be vertically adjusted by the shaft $2^{\times}$, and hand wheel R. This carriage has a shaft T journaled therein, the end 4 of which is square to receive a wrench for turning the shaft and thus adjusting it back and forth in the carriage. Part of said shaft is threaded at 6 to engage threads within the bearing 7 of the carriage to permit longitudinal adjustment of the shaft. The shaft is provided with two small conical cutting heads 9, 9, which are so shaped as to impart the angular edges required in the tooth recess during the process of formation. The angular or bevel edges of the recesses made by the grinding heads is shown in Figs. 4 and 5.

Generally in the operation of forming the recesses the angular edges are first made throughout the sides and bottom of the groove and the bottom is then dressed down to form a blunt seat as in Fig. 4. The tooth adapted to be fixed in the recess must of course have the angular groove in its side to fit the beveled edge of the recess but this forms no part of my present invention. It will be understood that the recess is first cut out and then the edge is beveled off as shown in Figs. 3 and 4 and to perform the successive actions around the saw blade the carriage C with its cutter heads must be raised and lowered by the screw shaft 2 and hand wheel.

Power is applied to the cutter shaft to revolve the cutters by the band wheel X and cutters shown in Fig. 6 acting on the edge of the saw plate cut the recesses shown in Fig. 4, the saw plate being turned after each cut and adjusted for another recess.

I claim—

In combination, the vertical standard having the vertical slot therein, the bolt movable vertically in the slot and adapted to receive the saw blade to be toothed, the cutters at the upper end of the vertical standard, the carriage carrying the cutter shaft and the means for adjusting the said carriage vertically whereby both the said saw carrying bolt and the cutters may be adjusted in the same vertical plane toward and from each other, the said standard being surmounted by guide ways extending vertically with the cutter shaft extending horizontally across the top of the standard, substantially as described.

In witness whereof I have hereunto set my hand in presence of two witnesses.

FÉLIX JULES GRÉGOIRÉ FROMHOLT.

Witnesses:
 ROBT. M. HOOPER,
 GEORGE LAURENT.